United States Patent
Stallworth

(10) Patent No.: US 7,725,913 B1
(45) Date of Patent: May 25, 2010

(54) SYSTEM AND METHOD FOR DELIVERING COMMUNICATION SIGNALS

(75) Inventor: F. David Stallworth, Beaufort, SC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1829 days.

(21) Appl. No.: 09/880,848

(22) Filed: Jun. 15, 2001

(51) Int. Cl.
*H04N 7/18* (2006.01)
*H04N 7/173* (2006.01)

(52) U.S. Cl. .................................... 725/118; 725/74

(58) Field of Classification Search ............ 725/78, 725/81, 148, 74, 119, 118
See application file for complete search history.

(56) References Cited

U.S. PATENT DOCUMENTS

| | | | | |
|---|---|---|---|---|
| 5,613,190 A * | 3/1997 | Hylton | .................. | 725/81 |
| 5,761,602 A * | 6/1998 | Wagner et al. | ................. | 725/34 |
| 5,983,068 A * | 11/1999 | Tomich et al. | ................. | 725/32 |
| 6,072,983 A * | 6/2000 | Klosterman | .................. | 725/49 |
| 6,298,373 B1 * | 10/2001 | Burns et al. | .................. | 709/203 |
| 6,381,745 B1 * | 4/2002 | Paul | ............................. | 725/69 |
| 6,486,907 B1 * | 11/2002 | Farber et al. | .................. | 725/78 |
| 2001/0012293 A1 * | 8/2001 | Petersen et al. | ............. | 370/389 |
| 2002/0063924 A1 * | 5/2002 | Kimbrough et al. | ......... | 359/125 |
| 2005/0028208 A1 * | 2/2005 | Ellis et al. | ..................... | 725/58 |

* cited by examiner

*Primary Examiner*—James Sheleheda

(57) ABSTRACT

A system and method for delivering a communication signal to a subscriber without incurring right-of-way franchise fees associated with the signal. A central office on a first side of a right-of-way is in communication with a multiplexer on a second side of the right-of-way opposite the first side. The central office transmits a signal (e.g., a telephony signal) to the multiplexer such that the signal crosses the right-of-way. A wireless receiver on the second side receives another signal (e.g., a video signal) and transmits the other signal to the multiplexer. The multiplexer combines the signal and the other signal into a combined signal for routing to the subscriber (located on the second side). Because the communication of the other signal occurs entirely on the second side and does not access or cross into the right-of-way, the addition of the other signal avoids the imposition of a right-of-way franchise fee.

17 Claims, 7 Drawing Sheets

SYSTEM AND METHOD FOR DELIVERING COMMUNICATION SIGNALS

BACKGROUND

1. Field of the Invention

The present invention relates generally to the delivery of communication signals and the provision of media and communication services. In particular, the present invention relates to a system and method for delivering television services via a fiber optic network without being subject to right-of-way franchise fees.

2. Background of the Invention

The telecommunications industry has long recognized the many advantages that fiber optic cabling and transmission devices hold over other traditional terrestrial media, such as copper wire transmission systems. Fiber optic systems provide significantly higher bandwidth and greater performance and reliability than standard copper wire systems. For example, fiber optic systems can transmit up to 10 gigabits per second (Gbps), while copper lines transmit at typically less than 64 kilobits per second (Kbps). Optical fibers also require fewer repeaters over a given distance to keep a signal from deteriorating. Optical fibers are immune to electromagnetic interference (from lightning, nearby electric motors, and similar sources), to crosstalk from adjoining wires, and to signal egress. Optical fibers are also highly secure because of the difficulties involved in placing a physical tap on a line without detection and in intercepting and distinguishing a particular transmission among thousands of encrypted digital signals. Additionally, cables of optical fibers can be made smaller and lighter than conventional copper wire or coaxial tube cables, yet they can carry much more information, making them useful for transmitting large amounts of data between computers and for carrying bandwidth-intensive television pictures or many simultaneous telephone conversations. Due to the many advantages of fiber optic transmission, virtually all high-speed communications networks use fiber optic technology for long-haul transmission. Moreover, network providers (e.g., telephone service providers) have recently been focusing on end-to-end solutions that deliver fiber optic service from the provider to as close to the subscriber as possible. Of these end-to-end solutions, the preferred choice is Fiber-To-The-Home (FTTH), which provides a continuous fiber optic signal all the way into the subscriber premises. Less desirable, but less expensive, solutions involve hybrid transmission systems that bring fiber to a central location among a group of subscribers, and use other media to complete the last link to the subscribers, such as coaxial cable, twisted copper pair, or wireless transmission. These hybrid transmission systems are referred to as Fiber-To-The-Neighborhood (FTTN) or Fiber-To-The-Curb (FTTC). In the context of the present invention, any of these fiber optic transmission systems, including FTTH, FTTN, and FTTC, are referred to as Fiber-In-The-Loop (FITL) network architectures.

FIG. 1 illustrates an example of a conventional Fiber-In-The-Loop architecture 100 for the delivery of telephony and data services. As shown, the architecture 100 includes, at its broadest level, a central office terminal 102, a remote terminal 104, and optical network units 108.

Central office terminal 102 performs the switching functions of the network, routing calls to and from subscribers 112. Central office terminal 102 is in communication with remote terminal 104 through fiber optic cable 114. Fiber optic cable 114 is a main distribution cable that consists of many individual fiber optic strands. Fiber optic cable 114 runs, for example, along major roads, passing in front of housing subdivisions along those roads. Remote terminal 104 receives a strand of fiber optic cable 114 and splits the strand into two or more fiber optic strands, depending on the number of optical network units that remote terminal 104 serves. (Remote terminals are sometimes also referred to as distribution splitters.) In most instances, remote terminal 104 would be located at a point at which fiber optic service must be distributed from fiber optic cable 114 to a group of subscribers, such as in front of a housing subdivision. In the example of FIG. 1, remote terminal 104 splits a strand of fiber optic cable 114 into four fiber optic strands 116, which each serve a separate optical network unit 108.

Optical network units 108 receive fiber optic strands 116 from remote terminal 104 and further split strands 116 into individual drops 118. Optical network units 108 can be located among a group of homes, such that individual drops 118 are routed to each home. Alternately, for multiple dwelling units (MDUs), such as condominiums, dormitories, and apartment complexes, an optical network unit 108 can be located on the side of the multiple dwelling unit, at which a strand 116 is split into individual drops 118 and routed to the individual dwelling units. Optical network units 108 are sometimes also referred to as local terminals or outside plant cable terminals.

Thus, in this example, remote terminal 104 splits the fiber optic strand of cable 114 into four fiber optic strands 116 and routes strands 116 to four separate optical network units 108. Optical network units 108 further split the four fiber optic strands 116 into eight drops 118 routed to eight separate subscribers 112. Therefore, remote terminal 104 is a 1×4 splitter and optical network units 108 are 1×8 splitters, such that the strand separated from fiber optic cable 114 into remote terminal 104 supports a total of thirty-two subscribers. In typical installations, the fiber optic drops connecting optical network unit to subscribers are twisted copper pairs or coaxial cable. In such a case, the optical network units convert the fiber optic signal received through the incoming strand into an electronic signal suitable for transmission through the copper drop or coaxial cable to the subscribers. In the example of FIG. 1, optical network units 108 convert the fiber optic signals from strands 116 to electronic signals and split the electronic signals into eight separate drops 118 to eight subscribers 112.

Instead of electrical lines, in some installations, drops 118 are fiber optic drops. In this case, optical network unit 108 does not need to convert the fiber optic signal to an electronic signal, and instead simply splits the fiber optic strand into eight fiber optic strands to eight subscribers 112. The fiber optic signal is then converted to an electronic signal on the premises of subscribers 112 to facilitate connection with the electronic equipment of subscribers 112 (e.g., a telephone or computer).

As another alternative, in some installations, drops 118 are wireless connections. In this case, optical network units 108 convert the fiber optic signals of strands 116 into wireless signals, and transmit the wireless signal to each of subscribers 112. The wireless signals are converted to electronic signals on the premises of subscribers 112 to facilitate connection with the electronic equipment of subscribers 112.

By using a fiber optic platform such as the exemplary architecture shown in FIG. 1, telephone service providers can easily accommodate large volumes of telephony and data traffic, and still have plenty of excess bandwidth. Seeking to maximize the return on their investment in the fiber optic infrastructure, telephone service providers are eagerly exploring ways to capitalize on the excess bandwidth by providing subscribers with expanded and integrated services, including video. In competing with traditional cable television operators that use coaxial cable networks, telephone service providers can use their existing fiber optic networks to deliver superior signal quality and expanded channel options. Furthermore, telephone service providers can use their existing fiber optic networks to provide subscribers with complete communication and entertainment packages, covering all voice, data, and video needs. Referring to FIG. 1, in a typical deployment, the telephone service provider would provide video service by injecting a video signal from central office 102 into the strand of fiber optic cable 114, in addition to the telephony and data signals. The telephone service provider would distinguish the video signal from telephony and data signals by using different frequencies, i.e., different colors or wavelengths of the light spectrum. For example, telephony and data signals are usually transmitted over a 1310-nanometer wavelength while video signals are transmitted over a 1550-nanometer wavelength. This technique of combining and transmitting multiple signals simultaneously at different wavelengths through the same fiber optic strand is generally known as wavelength division multiplexing. The combined telephony, data, and video signal travels in a strand of fiber optic cable 114 to remote terminal 104, at which point the strand is split into separate strands 116 to optical network units 108. Optical network units 108 separate the combined signal into the individual telephony, data, and video signals. Optical network units 108 also further split the individual signals of strands 116 for delivery through drops 118 to subscribers 112. Thus, the telephone service provider is able to deliver video signals, in addition to telephony and data signals, using its existing fiber optic telephony platform. Some telephone service providers refer to this combined telephony, data, and video service platform as Integrated Fiber-In-The-Loop (IFITL). Although the IFITL platform gives telephone service providers the ability to easily provide voice, data, and video services, the telephone service providers often face municipal franchise fees that can make the services cost-prohibitive for subscribers. Specifically, to provide subscribers with both telephony and television services, telephone service providers frequently must pay separate public right-of-way franchise fees imposed by local governing authorities, such as city and county governments, for both telephone and television services. These franchise fees apply whenever the transmission lines of the service provider use a public right-of-way.

As an example, referring to FIG. 1, telephone service providers usually must cross a public right-of-way to deliver telephony service from central office terminal 102 to subscribers 112. This public right-of-way would typically fall somewhere between central office terminal 102 and optical network unit 108. That is, the public right-of-way would be somewhere between the private property of the telephone service provider and the private property of the subscriber. In this situation, the telephone service provider pays the local governing authority a telephone franchise fee for the right to lay fiber optic cable in and to transmit telephony signals through the public right-of-way. Typically, these franchise fees cover only the delivery of telephone service, and perhaps also data.

In addition to the telephone franchise fee, local governing authorities require video service providers to pay a video franchise fees to deliver video services across public rights-of-way. Thus, if a telephone service provider supplies television service via fiber optic cable running through public rights-of-way, the telephone service provider must also pay the video franchise fee, even if the telephone service provider is already paying a telephone franchise fee for providing telephony services through the same fiber optic cable. The additional video franchise fee can cost as much as 5% of the telephone service provider's revenue derived from video services, which is usually a cost passed directly to the subscriber in the form of higher subscription fees.

Telephone service providers generally find that they can compete with cable television operators because they both must pay the video franchise fee. However, both telephone service providers and cable television operators find it difficult to compete with satellite television operators because satellite television operators avoid video franchise fees altogether by installing satellite receiver dishes on private property. The satellite receiver dish connects to the subscriber's televisions within the bounds of the subscriber's property, and therefore never crosses or accesses a public right-of-way.

As another advantage, satellite television operators can deploy their services to isolated subscribers or groups of subscribers, taking advantage of high profit subscribers and avoiding capital investments in areas that might not provide many subscribers. In contrast to the flexible deployment scheme of satellite television operators, cable television providers often have exclusive service agreements with local governing authorities that require them to serve remote and low profit areas as a condition of their exclusivity.

Despite these advantages, satellite television provides an incomplete solution. In particular, the satellite television operators do not offer expanded and integrated services that satisfy all of a subscriber's telephony, data, and video needs.

Overall, to stay competitive with cable and satellite television operators, telephone service providers would prefer to use their existing fiber optic network infrastructure while avoiding the video franchise fees imposed by local governing authorities. Solving this problem would enable the telephone service providers to provide an attractive communications and entertainment package, meeting all of a subscriber's telephony, data, and video needs.

SUMMARY OF THE INVENTION

The present invention is a system and method for delivering a communication signal to a subscriber without incurring right-of-way franchise fees associated with the signal. In a representative implementation, the communication signal is a video signal for which a local governing authority would charge a video franchise fee for accessing or crossing a public right-of-way.

According to this representative implementation, a central office located on a first side of a right-of-way is in communication with a multiplexer located on a second side of the right-of-way, opposite the first side. The central office transmits a signal (e.g., a telephony signal) to the multiplexer such that the signal crosses the right-of-way to reach the multiplexer. A wireless receiver located on the second side of the right-of-way receives another signal (e.g., a video signal) and transmits the other signal to the multiplexer. The multiplexer combines the signal (e.g., the telephony signal) and the other signal (e.g., the video signal) into a combined signal for routing to the subscriber. The subscriber is located on the second side of the right-of-way. Because the communication of the other signal (e.g., the video signal) occurs entirely on the second side of the right-of-way (i.e., on private property) and does not cross a public right-of-way, the addition of the (video) signal avoids the imposition of a public right-of-way video franchise fee.

This unique deployment strategy benefits a service provider in many ways. First and foremost, the service provider can add services (e.g., video service) without having to pay public right-of-way franchise fees. Avoiding these fees enables a service provider, especially telephone service providers, to offer television service pricing competitive with that of satellite television services.

Another significant benefit of the present invention derives from the use of an existing fiber optic telephone infrastructure. Specifically, injecting a video signal into existing telephony and data fiber optic strands avoids the cost of installing a fiber optic strand devoted to video service. The service provider does not have to install additional underground utilities. Much to the contrary, the service provider can install the wireless receiver proximate to the incoming fiber optic telephony cable with minimal disruption of the private property. Along these lines, the present invention is especially useful for groups of associated subscribers that can receive the same video service, such as subscribers that are residents of the same gated community or the same multiple dwelling unit. Using the wireless receiver and existing fiber optic infrastructure minimizes the impact of construction and installation on the community or multiple dwelling unit.

As another benefit, the system and method of the present invention deliver superior signal quality and bandwidth capacity, especially in comparison to satellite television services that use single satellite dishes and coaxial cable to deploy television service to several subscribers of a multiple dwelling unit. The fiber optic technology of the present invention makes the superior signal quality and bandwidth possible.

As another benefit, the present invention enables a service provider to offer package deals to subscribers that cover all voice, data, and video needs. Such package deals are especially attractive for landlords of multiple dwelling units who typically prefer the convenience of paying one provider for telephony, data, and video services. With non-package deals, landlords carry the burden of dealing with multiple service providers, consolidating the costs of each into a monthly total, and ensuring that costs are accurately passed onto the tenants in the rent, for example. With the package deals enabled by the present invention, however, the landlord can pay a single provider for all services and simply plug that cost into the rent charged to tenants.

DESCRIPTION OF THE DRAWINGS

FIG. 2b is a flow chart outlining the method of the present invention corresponding to FIG. 2a.

DETAILED DESCRIPTION OF THE INVENTION

Figure 1:
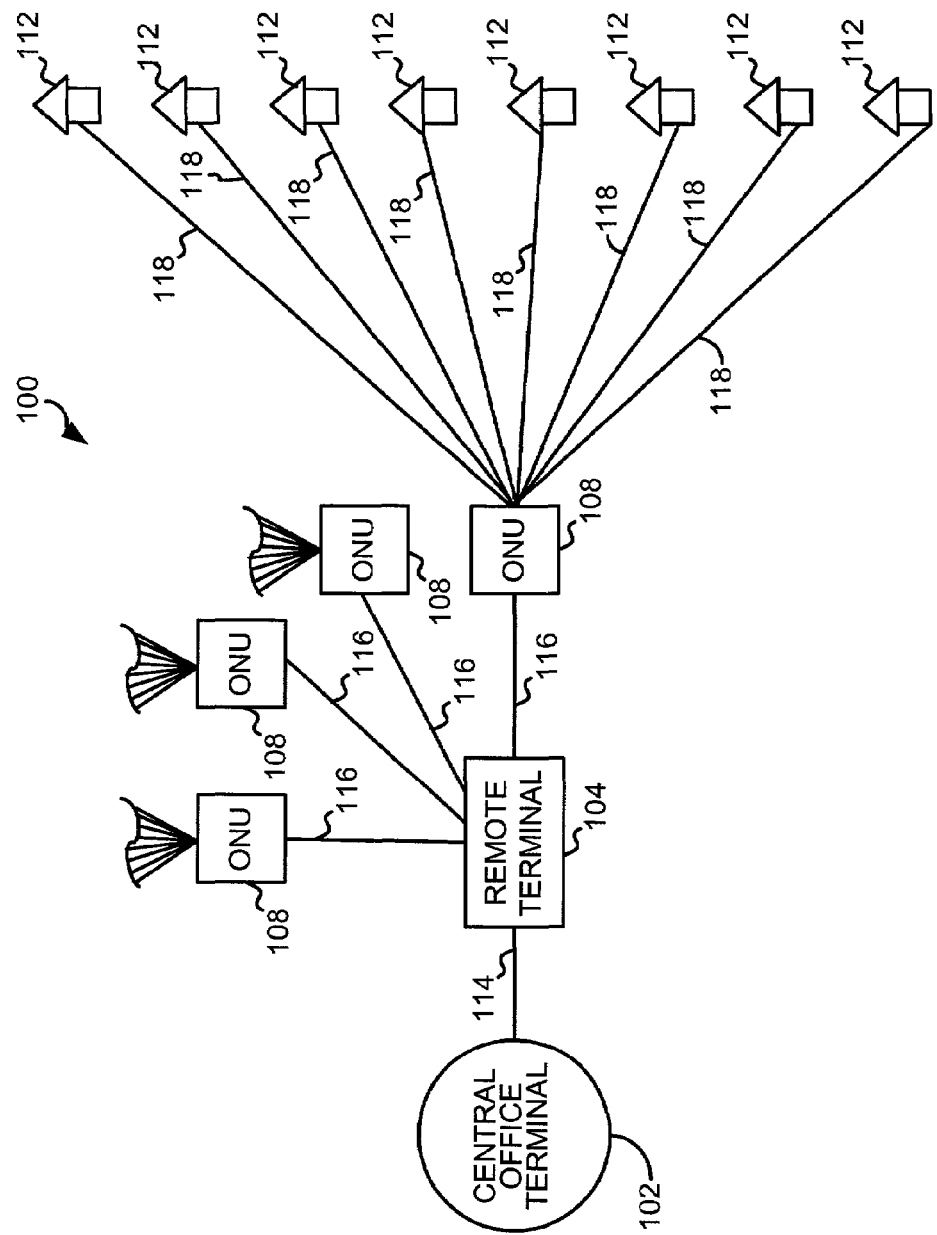
FIG. 1 is a schematic diagram of a conventional Fiber-In-The-Loop architecture for the delivery of telephony and data services.
Figure 2A:
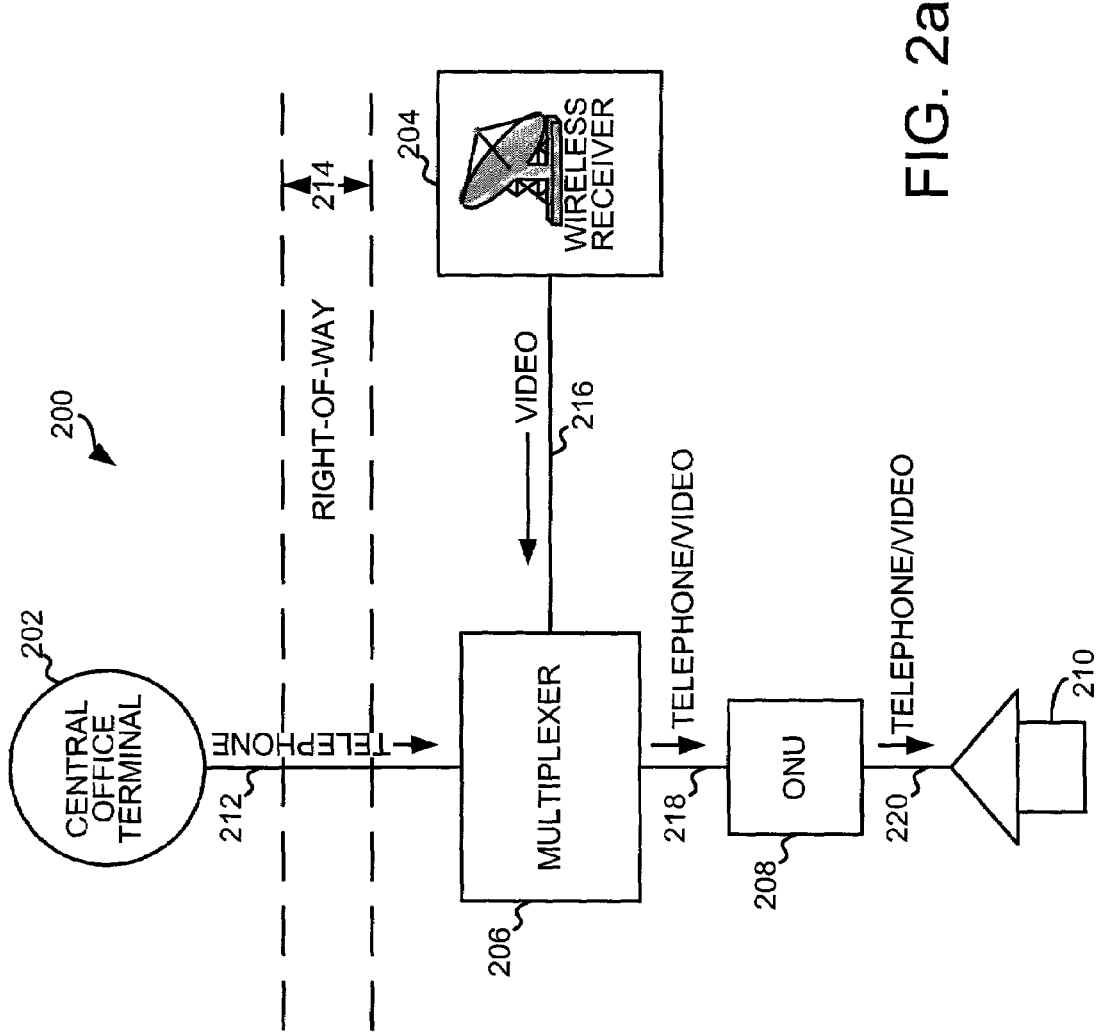
FIG. 2a is a schematic diagram of a system for delivering television service to a single subscriber, according to an embodiment of the present invention.

The present invention is a system and method for delivering a communication signal that is subject to public right-of-way franchise fees via a fiber optic platform. FIG. 2a illustrates a representative embodiment of this system and method, in which the communication signal is a video signal.

As shown, system 200 includes a central office 202, a wireless receiver 204, a multiplexer 206, an optical network unit 208, and a subscriber 210. For illustration purposes, system 200 depicts a simplified deployment of one fiber optic strand from central office 202 to the electronic equipment of subscriber 210. As one of ordinary skill in the art would appreciate, in a typical network deployment, system 200 would include a large number of individual fiber optic strands, as well as additional network distribution components necessary to route the fiber optic strands throughout a deployment region. For example, system 200 could include multiple fiber optic strands routed from central office 202 to multiple remote terminals, which split the multiple fiber optic strands for distribution to multiple multiplexers and optical network units. In the simplified illustration of FIG. 2, central office 202 provides telephony and data signals through fiber optic strand 212 to multiplexer 206. A public right-of-way 214 is located between central office 202 and multiplexer 206 such that fiber optic strand 212 must cross or pass through public right-of-way 214 to reach multiplexer 206. Consequently, the telephony and data signals that central office 202 provides must traverse public right-of-way 214, thereby requiring the provider of the telephone service (e.g., the administrator of system 200) to pay telephone franchise fees.

Wireless receiver 204 is located on a side of public right-of-way 214 opposite central office 202. In other words, wireless receiver 204 is located on the same side as multiplexer 206, optical network unit 208, and subscriber 210. Wireless receiver 214 receives over-the-air video signals and transmits the video signals to multiplexer 206 through a fiber optic strand 216. Because the video signal never crosses public right-of-way 214, this deployment scheme does not subject the service provider to video franchise fees.

Multiplexer 206 receives the telephony and data signals from central office 202 through fiber optic strand 212, and the video signals from wireless receiver 204 through fiber optic strand 216. Multiplexer 206 then combines the telephony, data, and video signals for transmission through a single fiber optic strand 218. Even though combined, the signals are distinguishable from each other because of the use of different wavelengths, e.g., a 1310-nanometer wavelength for voice/data and a 1550-nanometer wavelength for video.

Multiplexer 206 routes the combined signal to optical network unit 208 via fiber optic strand 218. Optical network unit 208 separates the combined signal into its individual telephony, data, and video signals, and converts the individual fiber optic signals into electronic signals for delivery through drop 220 to subscriber 210. Drop 220 could be, for example, a coaxial cable or twisted copper pair. Although this simplified illustration depicts only one subscriber 210, optical network unit 208 could also split the individual signals for delivery to multiple subscribers if necessary.

Instead of coaxial cable or twisted copper pair, drop 220 could be a wireless link, in which case optical network unit 208 would convert the individual fiber optic signals into wireless signals, and the wireless signals would be converted to electronic signals on the premises of subscriber 210. Or, alternately, drop 220 could be a fiber optic drop, in which case optical network unit 208 would not convert the individual fiber optic signals at all, and would simply pass the signals onto the premises of subscriber 112 where the conversion to an electronic signal would take place.

Overall, system 200 enables a service provider to deliver integrated telephony, data, and video services to a subscriber using an existing fiber optic telephony infrastructure, but without incurring video franchise fees. The existing fiber optic telephony infrastructure would typically be in place from central office 202 to subscriber 210. The service provider would already be paying telephone franchise fees for delivering telephone and data service across public right-of-way 214. But, instead of multiplexing the video signal at central office 202 and paying video franchise fees for delivering the video signal across public right-of-way 214, system 200 injects the video signal using wireless receiver 204 and multiplexer 206 on the same side of public right-of-way 214 as subscriber 210. The service provider therefore avoids video franchise fees and can offer more competitive video service prices. In addition, the service provider can offer subscribers the convenience of an integrated voice, data, and video service from a single-source provider.

As an alternative to the system configuration of FIG. 2a, instead of locating multiplexer 206 upstream of optical network unit 208, multiplexer 206 could be installed in fiber optic strand 220 between optical network unit 208 and subscriber 210. In this alternate configuration, fiber optic strand 220 would preferably be a fiber optic drop. Multiplexer 206 would only have the ability to distribute the video signal to one subscriber (subscriber 210), which would be acceptable in the simplified example of FIG. 2a. However, in situations in which it is desirable to deliver the same video service to several subscribers connected to one optical network unit (e.g., as in a multiple dwelling unit), multiplexer 206 is preferably located ahead of optical network unit 208 so that a single video signal (combined with telephony and data) is delivered to splitter, where it is split and distributed to the group of subscribers.

Figure 2B:
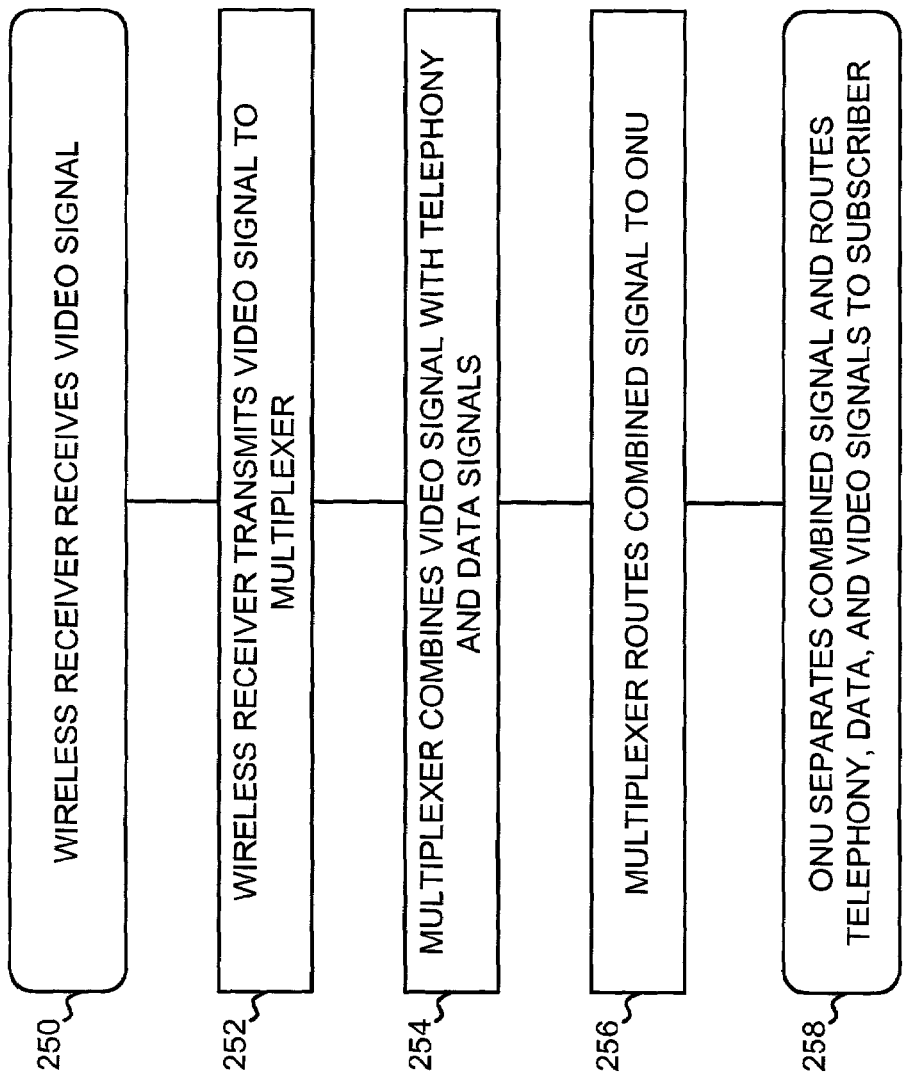

Corresponding to FIG. 2a, the flow chart of FIG. 2b outlines the method for delivering television service to subscriber 210, according to an embodiment of the present invention. The method begins in step 250 with wireless receiver 204 receiving an over-the-air video signal on the same side of public right-of-way 214 as subscriber 210. Wireless receiver 204 converts the electronic over-the-air video signal into an optical video signal.

In step 252, wireless receiver 204 transmits the optical video signal to multiplexer 206. Multiplexer 206 is also located on the same side of public right-of-way as subscriber 210.

In step 254, multiplexer 206 combines the optical video signal with telephony and data optical signals it receives from central office 202.

In step 256, multiplexer 206 routes the combined telephony, data, and video signal to optical network unit 208. Optical network unit 208 is also located on the same side of public right-of-way as subscriber 210.

In step 258, optical network unit 208 separates the combined signal into its individual telephony, data, and video signals, and routes the individual signals through drop 220 to subscriber 210.

Figure 3:
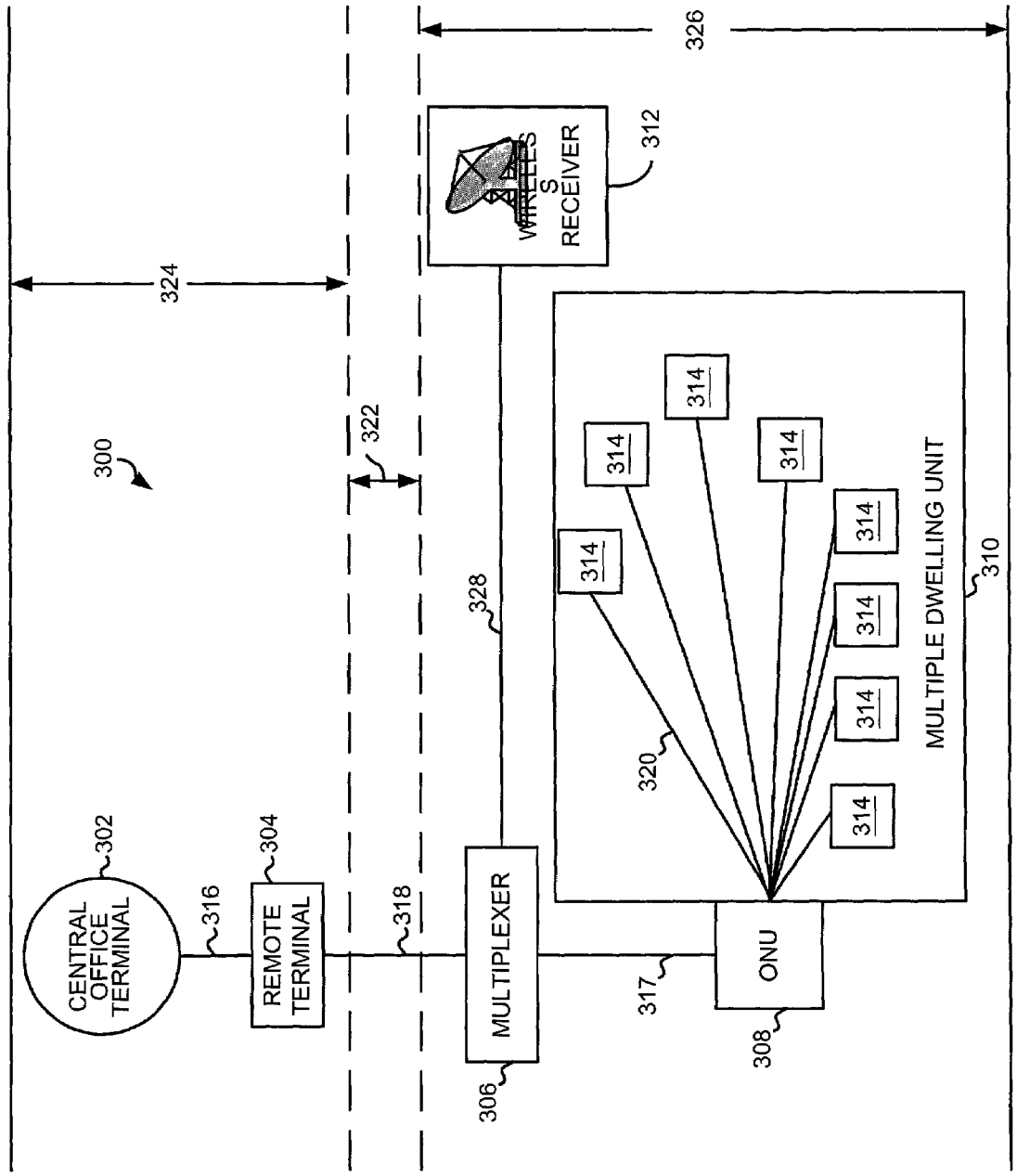
FIG. 3 is a schematic diagram of a system and method for delivering television service to multiple subscribers, according to an embodiment of the present invention.

FIG. 3 illustrates an embodiment of the present invention that delivers television service to a group of associated subscribers via a fiber optic network and, again, does so without incurring video franchise fees. A single optical network unit serves the group of associated subscribers. Relative to FIG. 2a, instead of just one subscriber in communication with a central office through a single fiber optic strand, the embodiment of FIG. 3 illustrates multiple fiber optic strands linking multiple subscribers to a central office.

As shown in FIG. 3, system 300 includes a central office terminal 302, a remote terminal 304, a multiplexer 306, an optical network unit 308, a multiple dwelling unit (MDU) 310, and a wireless receiver 312. Together, these components provide the subscribers 314 of multiple dwelling unit 310 with integrated voice, data, and video service. In the architecture of FIG. 3, central office terminal 302 performs the switching functions of the network, routing telephony and data signals to multiple dwelling unit 310 via remote terminal 304, multiplexer 306, and optical network unit 308. Central office terminal 302 is in communication with remote terminal 304 through fiber optic strand 316. Fiber optic strand 316 would typically be spliced from a main fiber optic distribution cable consisting of many individual fiber optic strands.

Remote terminal 304 receives fiber optic strand 316 and splits strand 316 into two or more fiber optic strands 318. The number of fiber optic strands 318 depends on the number of optical network units that remote terminal 304 serves. For instance, if remote terminal 304 serves four optical network terminals, then remote terminal would be a 1×4 splitter that splits strand 316 into four strands 318, which are routed to four optical network units. For clarity, FIG. 3 shows only the one strand 318 routed from remote terminal 304. Strand 318 runs from remote terminal 304 to multiplexer 306.

Wireless receiver 312 receives a video signal and transmits the video signal through fiber optic connection 328 to multiplexer 306. Fiber optic connection 328 is described in more detail below in reference to FIGS. 3 and 4. Wireless receiver 312 could be any device capable of receiving over-the-air signals (as opposed to landline signals) and converting those signals to fiber optic signals. As an example, wireless receiver 312 could be a satellite dish that receives video signals transmitted from a satellite. As another example, wireless receiver 312 could also be a radio receiver receiving video signals from a radio transmitter.

Multiplexer 306 is in communication with remote terminal 304 through fiber optic strand 318 and with wireless receiver 312 through fiber optic connection 328. Multiplexer 306 receives telephone and data signal through strand 318, and receives a video signal from wireless receiver 312 through fiber optic connection 328. Multiplexer 306 combines the video signal from wireless signal 312 with the telephone and data signal of strand 318 and simultaneously routes the telephone, data, and video signals to optical network unit 308 through fiber optic strand 317. Preferably, multiplexer 306 is a wave division multiplexer.

Optical network unit 308 receives the combined signal from multiplexer 306 and separates the combined fiber optic signal into its individual telephone, data, and video signals. Optical network unit 308 also converts the individual optical signals into electronic signals (in the case of twisted copper pair or coaxial drops 320) and splits the signals for routing through drops 320 to subscribers 314. The number of splits and the number of drops 320 depend on the number of subscribers 314 served by optical network unit 308. Typically, a standard optical network unit serves six to eight subscribers. As shown in the exemplary embodiment of FIG. 3, optical network unit 308 is a 1×8 splitter that splits the signals received from strand 317 into eight signals routed through eight drops 320 to eight subscribers 314. Drops 320 can be, for example, copper drops, coaxial cable, wireless links, or fiber optic drops. In this example, the public right-of-way 322 is between remote terminal 304 and optical network unit 308. Central office terminal 302 and remote terminal 304 are on property 324 of the network provider. Multiplexer 306, wireless receiver 312, optical network unit 308, and multiple dwelling unit 312 are on private property 326. The network provider delivers telephone and data service to subscribers 314 through fiber optic strand 318, which crosses public right-of-way 322. Therefore, the network provider pays a telephone franchise fee to the municipality that controls public right-of-way 322, such as a city or county government. Unlike the prior art systems that multiplex the telephone and video signals at central office terminal 302 and deliver both signals across public right-of-way 322 through fiber optic strand group 318, system 300 injects the video signal downstream of public right-of-way 322 through multiplexer 306. Thus, wireless receiver 312 receives the video signal and transmits the video signal to subscribers 314 entirely within the bounds of private property 326, thereby avoiding the video franchise fees levied for crossing public right-of-way 322.

Figure 4:
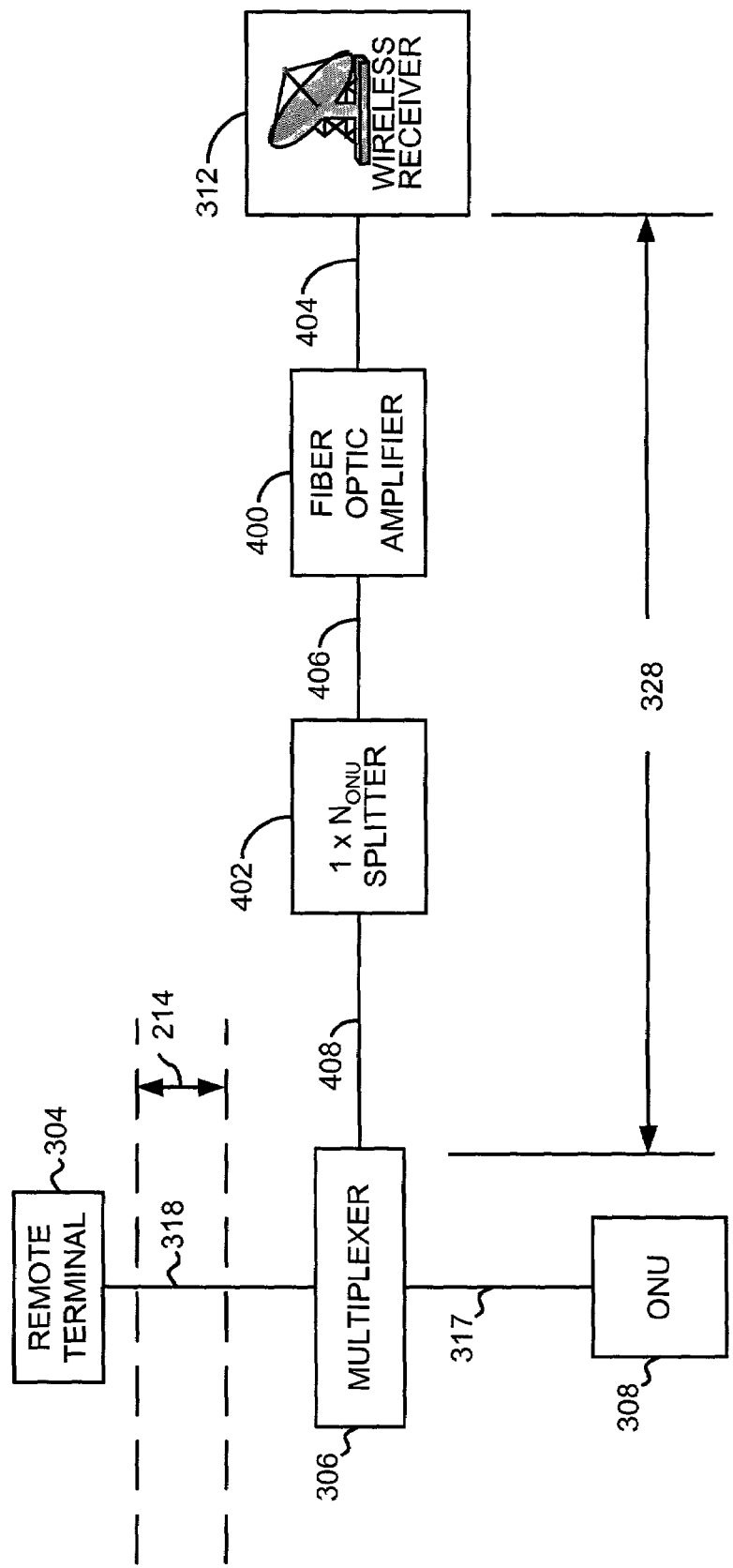
FIG. 4 is a schematic diagram that illustrates in more detail the fiber optic connection between the wireless receiver and the multiplexer in FIG. 3, according to an embodiment of the present invention.

FIG. 4 illustrates the fiber optic connection 328 of FIG. 3 in more detail. As shown, fiber optic connection 328 (between wireless receiver 312 and multiplexer 306) includes a fiber optic amplifier 400 and a splitter 402.

Fiber optic amplifier 400 receives a fiber optic video signal from wireless receiver 312 through fiber optic strand 404. Fiber optic amplifier 400 boosts the light level of the fiber optic video signal to make the signal strong enough to maintain adequate integrity through splitters downstream of wireless receiver 312, such as splitter 402 and optical network unit 308 in this example. As a guideline, in a representative implementation serving 32 optical network units and 256 subscribers, fiber optic amplifier 400 boosts the light level 18-20 dB. After fiber optic amplifier 400 amplifies the optical video signal, it routes the signal to splitter 402 through fiber optic strand 406.

Splitter 402 splits the video signal into separate fiber optic strands, each delivering the same video signal. Preferably, splitter 402 is a 1×$N_{ONU}$ splitter, where $N_{ONU}$ is the number of optical network units (ONU) to which the video signal of wireless receiver 312 is delivered. In the representative embodiment of FIG. 4, only one optical network unit 308 receives a video signal. Therefore, splitter 402 is a 1×1 splitter. Splitter 402 is in communication with multiplexer 306 through fiber optic strand 408. The output of splitter 402 can be factory spliced to fiber optic strand 408. Alternatively, fiber optic strand 408 could be a jumper with connectorized ends that connect to splitter 402 and multiplexer 306.

Multiplexer 306 receives the video signal from splitter 402 through fiber optic strand 408, and the telephony and data signal from remote terminal 304 through fiber optic strand 318. Multiplexer 306 combines, or "mixes," these signals for delivery through a single fiber optic strand 317. Therefore, in this example, multiplexer 306 is a 1×2 multiplexer. Preferably, multiplexer 306 is a wave division multiplexer.

With the telephony, data, and video signals combined, multiplexer 306 routes the combined signal through fiber optic strand 317 to optical network unit 308. Then, as described above in reference to FIG. 3, optical network unit 308 de-multiplexes the combined signal, converts the fiber optic signals to electronic signals (in the case of copper or coaxial drops), and splits the signals for delivery through drops 320 to subscribers 314 (shown in FIG. 3). Thus, optical network unit 308 is both a de-multiplexer and a splitter.

Figure 5:
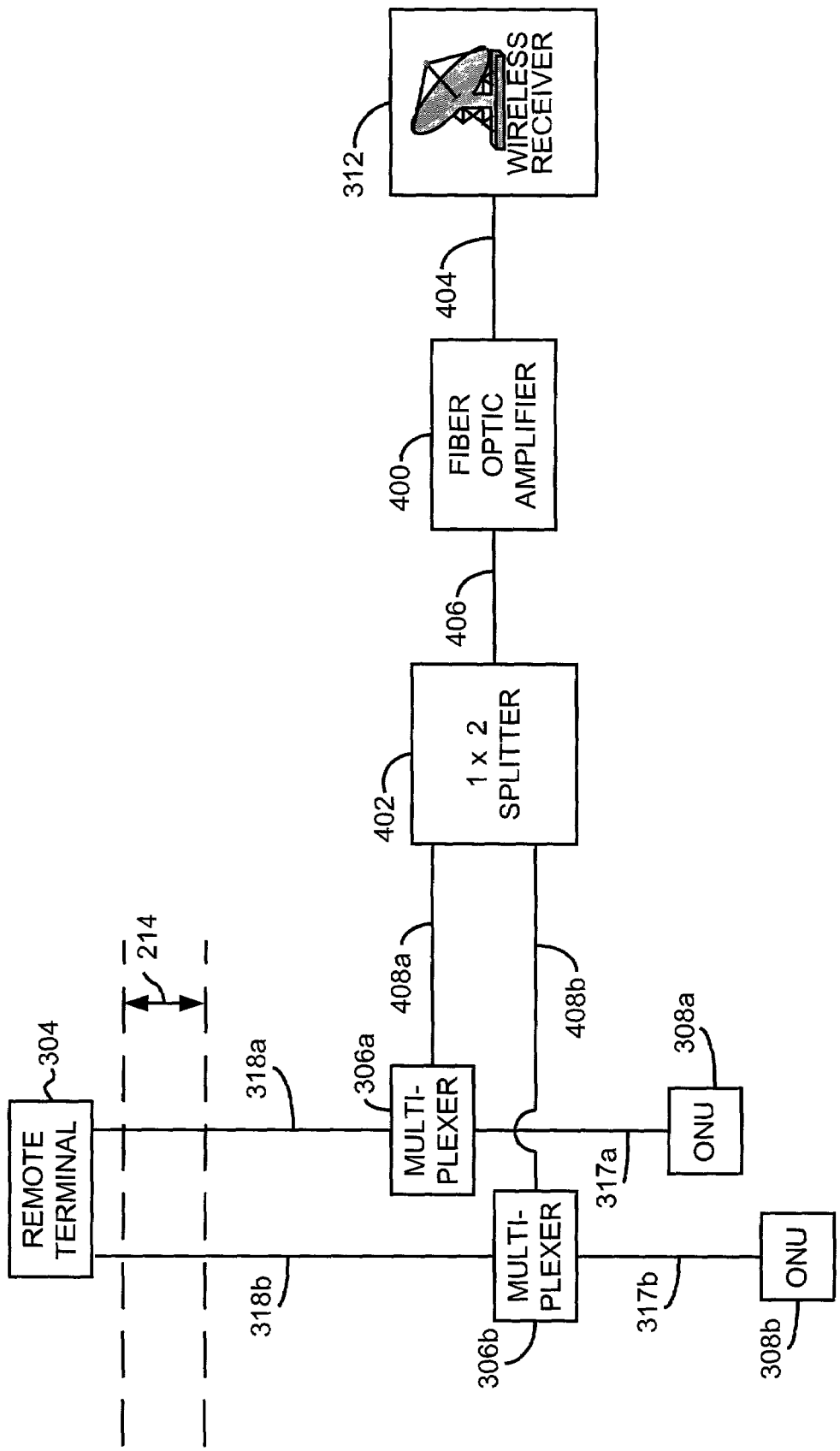
FIG. 5 is a schematic diagram of a system in which a wireless receiver transmits video signals to two optical network units, according to an embodiment of the present invention.

FIG. 5 illustrates an exemplary system architecture for delivering video signals from wireless receiver 312 to more than one optical network unit. As shown, in this example, wireless receiver 312 serves two optical network units 308a and 308b. Accordingly, splitter 402 is a 1×2 splitter that splits fiber optic strand 406 into fiber optic strands 408a and 408b, through which identical fiber optic video signals are routed.

Fiber optic strands 408a and 408b are respectively routed to individual multiplexers 306a and 306b. In turn, multiplexers 306a and 306b receive telephony and data signals through separate fiber optic strands 318a and 318b, respectively. Multiplexers 306a and 306b perform the mixing functions described above and deliver combined telephony, data, and video signals through their respective fiber optic strands 317a and 317b to their respective optical network units 308a and 308b.

As depicted in FIG. 5, according to this representative architecture of the present invention, every optical network unit that receives a video signal from wireless receiver 312 has a separate multiplexer, along with separate fiber optic strands connecting splitter 402 to the multiplexer, remote terminal 304 to the multiplexer, and the multiplexer to the optical network unit.

Figure 6:
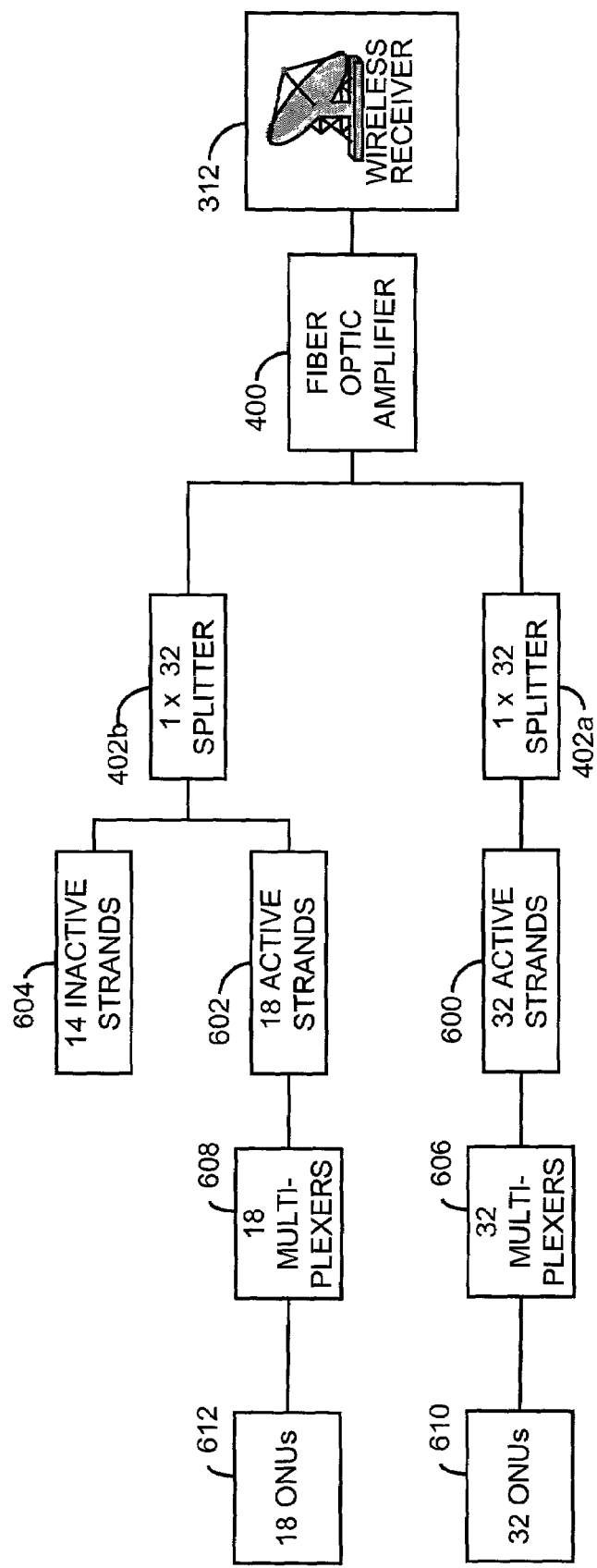
FIG. 6 is a schematic diagram of a system in which a wireless receiver transmits video signals to fifty optical network units, according to an embodiment of the present invention.

In an actual fiber optic deployment, the number of optical network units that wireless receiver 312 must serve often exceeds the capacity of a standard off-the-shelf splitter. For example, wireless receiver 312 may serve fifty optical network units, which exceeds the capacity of a commonly available 1×32 fiber optic splitter. In this case, fiber optic connection 328 would include two 1×32 splitters, providing sixty-four separate fiber optic strands, fifty of which would be used to serve the fifty optical network units. FIG. 6 illustrates this situation. As shown in FIG. 6, wireless receiver 312 transmits a fiber optic video signal to fiber optic amplifier 400, as described above with reference to FIG. 4. Then, as with the above-described embodiment, fiber optic amplifier 400 boosts the light level of the video signal. However, in addition to this amplification, fiber optic amplifier 400 also splits the fiber optic video signal into a number of signals equal to the number of splitters with which it is in communication. In this example, because wireless receiver 312 is serving fifty optical network units 612 and 610, there are two splitters 402a and 402b, each requiring a separate video signal. Therefore, fiber optic amplifier 400 includes a 1×2 splitter. The 1×2 splitter of fiber optic amplifier 400 routes identical video signals to 1×32 splitters 402a and 402b, which each split the video signal that it receives into thirty-two identical video signals, for a total of sixty-four identical video signals carried through sixty-four separate fiber optic strands. Of these sixty-four strands, thirty-two strands 600 from splitter 402a and eighteen strands 602 from splitter 402b serve the fifty downstream optical network units 612 and 610. The extra fourteen strands 604 derived from splitter 402b remain available for future capacity.

Specifically, the thirty-two strands 600 from splitter 402a feed thirty-two multiplexers 606, which in turn feed thirty-two optical network units 610. The eighteen strands 602 feed eighteen multiplexers 608, which in turn feed eighteen optical network units 612. When several multiplexers are required in a deployment, the multiplexers are preferably housed together in an enclosure, such as a splice enclosure or splice case.

Although the specific embodiments illustrated in FIGS. 3-6 describe the deployment of a television service to a multiple dwelling unit, one of ordinary skill in the art would appreciate that the present invention has useful applications to other groups of associated subscribers. For instance, the invention would be especially useful for a group of associated subscribers who have agreed to purchase television services together, perhaps at a favorable discount. Subscribers belonging to a homeowners association, or subscribers within a gated community or retirement community could benefit from such an arrangement.

In addition, although this specification describes the present invention in the context of video signals injected into an existing fiber optic telephony architecture, one of ordinary skill in the art would appreciate that the present invention is equally applicable to other signals that may be subject to local franchise fees. For this reason, and notwithstanding the particular benefits associated with using the present invention for video signals, the system and method described herein should be considered broadly useful for any service provider wanting to deliver a signal-based service to subscribers without crossing a public right-of-way and incurring local franchise fees.

As an example, instead of receiving an over-the-air video signal on private property and combining that video signal with incoming telephony and data signals (as described above), an alternate embodiment of the present invention could receive over-the-air telephony and/or data signals and combine those signals with an incoming video signal. This scheme would be useful, for example, for a cable television service provider that already delivers video signals across public rights-of-way (and pays franchise fees for doing so) and that wants to expand its services to include telephone service without incurring additional franchise fees (i.e., telephone franchise fees).

Although the above-described embodiments are based on fiber optic deployments, the present invention contemplates other transmission media, including traditional terrestrial media such as copper wire or coaxial cable. The fiber optic deployment is preferred because the infrastructure already exists and has substantial bandwidth to accommodate the addition of video signals. However, it should be understood that the present invention is broadly applicable to any situation in which a service provider desires to carry additional communication signals over an existing communications infrastructure without incurring additional franchise fees for the delivery of those signals. Thus, for example, referring back to FIG. 2a, the communication links (212, 216, 218, and 220) between the system components could all be copper wire without departing from the spirit and scope of the present invention.

The system of the present invention can be constructed from readily available components. For example, referring to FIG. 4, wireless receiver 312 could be a satellite receiver manufactured by Scientific Atlanta of Lawrenceville, Ga. Fiber optic amplifier 400 could be a Model 4102116L8 fiber optic amplifier manufactured by Marconi of Bedford, Tex. Marconi also produces a combination splitter/wave division multiplexer (Model No. 4102107L2) that can perform the functions of both splitter 402 and multiplexer 306. In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

The invention claimed is:

1. A system for delivering to a subscriber located on a second side of a right-of-way a video signal that is free from a right-of-way franchise fee, the system comprising:
    a central office located on a first side of a right-of-way;
    an optical network unit on a second side of the right-of-way in communication with the central office, wherein the central office transmits both a telephony signal and a packetized data signal over the same fiber optic network to the optical network unit, the optical network unit connected to the fiber optic network via a dedicated fiber optic strand, the optical network unit being located on the second side of the right-of-way opposite the first side such that the telephony signal and the packetized data signal must cross the right-of-way to reach the optical network unit;
    a multiplexer on the second side of the right-of-way located between and in communication with the optical network unit and the subscriber via fiber optic strands; and
    a wireless receiver located on the second side of the right-of-way, the wireless receiver receiving the video signal and transmitting the video signal to the multiplexer, the multiplexer combining the video signal, the telephony signal and the packetized data signal into a combined signal for routing to the subscriber.

2. The system of claim 1, wherein the wireless receiver receives the video signal as an electronic signal and converts the electronic signal to a fiber optic signal to deliver the video signal through a fiber optic strand to the multiplexer.

3. The system of claim 1, wherein the wireless receiver is a radio receiver.

4. The system of claim 1, wherein the multiplexer is a wave division multiplexer.

5. The system of claim 1, wherein the video signal is transmitted over a first wavelength and wherein one of the telephony and the packetized data signal is transmitted over a second wavelength that is different from the first wavelength.

6. The system of claim 5, wherein the video signal is transmitted over a 1550-nanometer wavelength and at least one of the telephony data and the packetized data signal is transmitted over a 1310-nanometer wavelength.

7. The system of claim 1, wherein the right-of-way franchise fee is imposed by a local governing authority.

8. A method for delivering to a plurality of subscribers a first signal that is subject to right-of-way franchise fees, wherein the method comprises:
    transmitting a second signal and a third signal from a first side of the right-of way, through the right-of-way, and to an optical network unit located on a second side of the right-of-way, wherein the first side is opposite the second side, the second signal comprising at least a voice signal, the third signal comprising at least a packetized data signal, the second signal and third signal transmitted through the right-of-way via the same fiber optic network;

receiving, via a wireless communication, the first signal on the second side of the right-of-way such that the first signal does not pass through the right-of-way, the first signal comprising at least a video signal;

combining the first signal, the second signal and the third signal into a combined signal on the second side of the right-of-way at a wave division multiplexer and multiplexing the first signal with the second and third signals using the wave division multiplexer, wherein the wave division multiplexer is located between and in communication with the optical network unit and one of the plurality of subscribers via fiber optic strands; and routing the combined signal in the direction of the one of the plurality of subscribers, wherein the one of the plurality of subscribers is on the second side of the right-of-way.

9. The method of claim 8, wherein routing the combined signal comprises routing the combined signal from the wave division multiplexer to a splitter that is in communication with the subscriber.

10. The method of claim 9, wherein the splitter includes a wave division de-multiplexer, and separating the combined signal comprises separating the combined signal with the wave division de-multiplexer.

11. A method for delivering to a plurality of subscribers a first signal that is free of right-of-way franchise fees, wherein the method comprises:

transmitting a second signal and a third signal from a central office through a right-of-way to an optical network unit, wherein the central office is located on a first side of the right-of-way and the optical network unit is located on a second side of the right-of-way opposite the first side, the second signal comprising at least a voice signal, the third signal comprising at least packetized data, the second signal and third signal transmitted through the right-of-way via the same fiber optic network;

receiving the first signal at a wireless receiver located on the second side of the right-of-way, the first signal comprising at least a video signal;

transmitting the first signal from the wireless receiver to a multiplexer without crossing the right-of-way, the multiplexer located between and in communication with the optical network unit and a local terminal via fiber optic strands;

combining the first signal, the second signal and the third signal into a combined signal at the multiplexer;

routing the combined signal from the multiplexer to a local terminal that is located on the second side of the right-of-way; and separating the combined signal into the first signal, the second signal and the third signal at the local terminal.

12. The method of claim 11, wherein the wireless receiver is a satellite receiver and receiving the first signal comprises receiving the first signal in a satellite communication and converting the first signal from an electronic signal to a fiber optic signal.

13. The method of claim 11, wherein the multiplexer is a wave division multiplexer.

14. The method of claim 11, wherein a wave division de-multiplexer of the local terminal separates the combined signal.

15. The method of claim 11 wherein the first signal, the second signal and the third signal each originate from the same service provider.

16. A method for delivering to a plurality of subscribers a video signal that is free of right-of-way franchise fees, wherein the method comprises:

receiving both a telephony signal and a packetized data signal by an optical network unit over the same fiber optic network, wherein the telephony signal and packetized data signal travel through a right-of-way to be received by the optical network unit;

receiving by a multiplexer a video signal from a wireless receiver, the multiplexer located between and in communication with the optical network unit and one of the plurality of subscribers via fiber optic strands;

combining by the multiplexer the telephony signal, the packetized data signal and the video signal into a combined signal; and distributing by the multiplexer the combined signal to the one of the plurality of subscribers.

17. The method of claim 16 wherein the video signal, the telephony signal and the packetized data signal each originate from the same service provider.

* * * * *